United States Patent
Weber et al.

(10) Patent No.: US 10,793,151 B2
(45) Date of Patent: Oct. 6, 2020

(54) INSTALLATION SWITCHING DEVICE HAVING A HOUSING AND HAVING A SCREW CONNECTING CLAMP

(71) Applicant: ABB Schweiz AG, Baden (CH)

(72) Inventors: Ralf Weber, Heidelberg (DE); Erwin Muders, Heidelberg (DE); Klaus-Peter Eppe, Waldbrunn (DE)

(73) Assignee: ABB SCHWEIZ AG, Baden (CH)

( * ) Notice: Subject to any disclaimer, the term of this patent is extended or adjusted under 35 U.S.C. 154(b) by 10 days.

(21) Appl. No.: 15/616,948

(22) Filed: Jun. 8, 2017

(65) Prior Publication Data

US 2017/0369060 A1 Dec. 28, 2017

(30) Foreign Application Priority Data

Jun. 27, 2016 (DE) .......................... 10 2016 111 711

(51) Int. Cl.
*H01H 71/08* (2006.01)
*H01R 4/38* (2006.01)
(Continued)

(52) U.S. Cl.
CPC .......... *B60W 30/143* (2013.01); *B60W 30/08* (2013.01); *B60W 50/045* (2013.01);
(Continued)

(58) Field of Classification Search
CPC .......... H01H 1/00; H01H 45/00; H01H 63/00; H01H 69/00; H01H 2201/00;
(Continued)

(56) References Cited

U.S. PATENT DOCUMENTS

| | | | | |
|---|---|---|---|---|
| 2,953,771 A | * | 9/1960 | Kussy | H01R 4/363 439/791 |
| 5,209,622 A | * | 5/1993 | Kazino | F16B 35/047 411/386 |

(Continued)

FOREIGN PATENT DOCUMENTS

| | | | | |
|---|---|---|---|---|
| DE | 102007035016 A1 | | 1/2009 | |
| DE | 102013002009 A1 | * | 8/2014 | .......... H01R 13/447 |
| WO | WO 2010040457 A1 | * | 4/2010 | ............. H01R 4/301 |

*Primary Examiner* — Edwin A. Leon
*Assistant Examiner* — Milagros Jeancharles
(74) *Attorney, Agent, or Firm* — Leydig, Voit & Mayer, Ltd.

(57) ABSTRACT

An installation switching device has a housing and screw connecting clamp with an essentially frame-shaped clamping part having longitudinal faces, narrow faces and broad faces, a head-clamp screw received in a clamping part threaded aperture, and a current rail arranged fixed in the device extending through the frame-shaped clamping part interior, wherein a current rail broad face is oriented, as assembled, parallel to a clamping part broad face facing the head clamping screw, the screw supporting itself, screwed in, on the current rail, wherein consequently, the clamping part is displaceable in its longitudinal direction, parallel to the narrow face, relative to the current rail by further screwing in the head clamping screw so a connecting conductor can be fixedly clamped between the current rail face remote from the screw and the clamping part broad face remote from the screw, the housing having a screw receiving region guiding the screw head.

8 Claims, 3 Drawing Sheets

(51) Int. Cl.
*B60W 30/14* (2006.01)
*B60W 30/08* (2012.01)
*B60W 50/04* (2006.01)
*B60W 50/06* (2006.01)

(52) U.S. Cl.
CPC ............ *B60W 50/06* (2013.01); *H01H 71/08* (2013.01); *B60W 2554/00* (2020.02)

(58) Field of Classification Search
CPC ...... H01H 2203/00; H01H 71/08; H01R 9/26; H01R 4/4845; H01R 4/4827; H01R 4/4836; H01R 4/36; H01R 4/38; H01R 4/40
USPC ....... 337/37, 46, 62, 65, 66, 67, 72, 73, 112, 337/253; 439/791, 801–814, 885, 786, 439/815, 816, 817, 824, 828
See application file for complete search history.

(56) References Cited

U.S. PATENT DOCUMENTS

| | | | |
|---|---|---|---|
| 5,249,989 A * | 10/1993 | Alsch | H01R 4/301 439/812 |
| 5,553,787 A * | 9/1996 | Guginsky | H01R 13/595 439/472 |
| 5,747,741 A * | 5/1998 | Alsch | H01R 4/301 174/84 C |
| 5,842,890 A * | 12/1998 | Gimenez | H01R 4/30 439/718 |
| 6,186,199 B1 * | 2/2001 | Gittel | B23C 5/006 144/218 |
| 6,223,394 B1 * | 5/2001 | Salice | E05D 5/08 16/382 |
| 6,529,112 B1 * | 3/2003 | Leone | H01R 4/36 337/113 |
| 7,041,921 B2 * | 5/2006 | Kadan | H01H 1/5855 200/293 |
| 7,575,486 B2 * | 8/2009 | Weber | H01R 43/16 439/811 |
| 7,619,902 B2 * | 11/2009 | Buchbender | H01H 11/0031 174/59 |
| 7,704,105 B2 * | 4/2010 | Bitz | H01R 4/301 439/810 |
| 7,718,693 B2 * | 5/2010 | Walter | C07D 401/06 514/408 |
| 8,241,074 B2 * | 8/2012 | Watford | H01H 71/08 200/293 |
| 8,297,901 B2 * | 10/2012 | Raabe | B21H 3/02 411/393 |
| 8,814,609 B2 * | 8/2014 | Hausner | H01R 4/44 439/810 |
| 8,882,534 B2 * | 11/2014 | Pizzi | H01R 13/585 439/460 |
| 10,340,097 B2 * | 7/2019 | Weber | H01H 71/08 |
| 2001/0005658 A1 * | 6/2001 | Matsuda | H01R 11/05 439/801 |
| 2008/0099317 A1 * | 5/2008 | Weber | H01R 4/36 200/293 |
| 2009/0029604 A1 | 1/2009 | Weber et al. | |
| 2010/0003073 A1 * | 1/2010 | Stauss | F16B 7/187 403/258 |
| 2010/0167599 A1 * | 7/2010 | Clark | H01R 4/36 439/810 |
| 2010/0197175 A1 * | 8/2010 | Axel | F16B 35/005 439/814 |
| 2010/0227513 A1 * | 9/2010 | Bitz | H01R 4/301 439/813 |
| 2011/0097947 A1 * | 4/2011 | Claprood, Jr. | H01R 4/304 439/709 |
| 2011/0159749 A1 * | 6/2011 | Trico | H01R 4/307 439/810 |

* cited by examiner

INSTALLATION SWITCHING DEVICE HAVING A HOUSING AND HAVING A SCREW CONNECTING CLAMP

CROSS-REFERENCE TO RELATED APPLICATIONS

Priority is claimed to German Patent Application No. DE 10 2016 111 711.0, filed on Jun. 27, 2016, the entire disclosure of which is hereby incorporated by reference herein.

FIELD

The invention relates to an installation switching device having a housing and a screw connecting clamp.

BACKGROUND

A screw connecting clamp that is disclosed by way of example in DE 10 2007 035 016 A1 comprises an essentially frame-shaped clamping part having a longitudinal face, narrow face and broad faces, a head-clamp screw that is received in a threaded aperture of the clamping part, and a current rail that is arranged in a fixed manner in the installation switching device and that extends through the interior of the frame-shaped clamping part, wherein a broad face of the current rail is oriented in the assembled state parallel to a broad face of the clamping part that is facing the head clamping screw, wherein the head clamping screw supports itself in the screwed in state on the current rail and as a consequence the clamping part can be displaced in its longitudinal direction, parallel to the narrow face, relative to the current rail in the case of further screwing in the head clamping screw so that a connecting conductor can be fixedly clamped between the face of the current rail that is remote from the head clamping screw and the broad face of the clamping part that is remote from the head clamping screw, wherein the housing comprises a screw receiving region that guides the screw head of the head clamping screw laterally in its axial movement direction, said screw receiving region having a housing-side screw access aperture that opens an access to the screw head, wherein the screw receiving region comprises delimiting means in order to prevent the screw head penetrating the access aperture.

Such screw end clamps are also disclosed as tension bracket clamps. Said clamps are typically installed in installation switching devices, by way of example in circuit breakers or fault current circuit breakers, in order to connect connecting conductors to the installation switching device regardless of whether this involves exposed cable ends of flexible wire cables or fixed contact lugs of collecting current rail arrangements.

Installation switching devices are known to be used for the purpose of monitoring and connecting or disconnecting the current flow to a connecting clamp from an input side to an output side through the current path that leads through the device interior. For this purpose the screw connecting clamps in the interior of the installation switching device housing are attached in a clamp receiving chamber that is usually housed near to the narrow face of such an installation switching device.

The current rail is generally mounted in a fixed manner in the interior of the housing. Internal connecting conductors are attached to the free ends of said current rail that are facing the device interior, said internal connecting conductors further guiding the current path between the input side and output side connecting clamp, wherein the current path is further guided by way of further functional assemblies or components in the housing interior, by way of example by way of a contact site and also where appropriate a thermal or magnetic trigger.

In the case of the opened clamp, a receiving chamber for inserting the end of a connecting conductor is formed between the broad face of the clamping part that is remote from the head of the clamping screw and the broad face of the current rail that is remote from the clamping screw.

Since the current rail is mounted in a fixed manner, the clamping part displaces relative to the current rail if, during the course of actuating the clamping screw when said clamping screw is screwed into the housing interior, the clamping end of the shaft of the clamping screw makes contact with the current rail. In fact, the clamping part is then pushed outwards against the axial displacement direction of the clamping screw when screwing in the direction of the screw access aperture.

As a consequence, the broad face of the clamping part that is remote from the head of the clamping screw moves in the direction of the broad face of the current rail that is remote from the clamping screw. A connecting conductor that previously in the case of an opened clamp has been pushed into the receiving chamber between the broad face of the clamping part that is remote from the head of the clamping screw and the broad face of the current rail that is remote from the clamping screw is consequently fixedly clamped between the broad face of the clamping part that is remote from the head of the clamping screw and the broad face of the current rail that is remote from the clamping screw.

The clamping screw is rotated in the opening direction so as to open the clamp, in the case of screws comprising a metric thread said direction is typically anticlockwise. As a consequence, the screw shaft displaces with the screw head in the axial direction in the direction of the screw access opening in the housing. The screw head then makes contact with the delimiting means, which prevents the screw head penetrating outwards through the screw access aperture. The clamping screw is consequently retained in the housing in a loss-proof manner. In the case of further rotating the clamping screw in the opening direction, the clamping screw could then however slide out of the clamping part-side thread, there is in other words the risk of losing the clamping screw out of the clamping part, which impedes the clamping screw being screwed in again. Or, if the clamping screw is embodied as longer in order to prevent the clamping screw from being lost out of the clamping part, in the case of further actuating the clamping screw downwards, the clamping part is then pressed further into the housing, which can lead to tension and jamming the clamping part and can impede rotating the clamp again.

SUMMARY

An aspect of the invention provides an installation switching device, comprising: a housing; and a screw connecting clamp including an essentially frame-shaped clamping part including longitudinal faces, narrow faces, and broad faces; a head-clamp screw configured to be received in a threaded aperture of the clamping part; and a current rail arranged in a fixed manner in the installation switching device, the current rail extending through an interior of the frame-shaped clamping part, wherein a current rail broad face is oriented, as assembled, parallel to a clamping part broad face facing the head clamping screw, wherein the head clamping screw supports itself, screwed-in, on the current rail and, consequently, the clamping part can be displaced in its longitudinal direction, parallel to one of the narrow faces, relative to the current rail during further screwing in the head clamping screw so that a connecting conductor can be fixedly clamped between a face of the current rail remote from the head clamping screw and the broad face of the clamping part that is remote from the head clamping screw, wherein the housing includes a screw receiving region configured to guide the screw head of the head clamping screw laterally in its axial movement direction, wherein the screw receiving region includes a housing-side screw access aperture that opens an access to the screw head, wherein the screw receiving region includes a delimiter configured to prevent the screw head from penetrating the screw access aperture, wherein a thread-free end section is located on an end section of the screw shaft of the head clamping screw lying opposite the screw head.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

It is therefore an aspect of the present invention to further develop an installation switching device having a housing and a screw connecting clamp so that the clamping screw is retained in a loss-proof manner not only in the housing but also is retained in a secure manner in the clamping part, and moreover the disadvantages of the solutions disclosed in the prior art with regard to the clamping part tilting in the opened state are avoided.

In other words, in accordance with an aspect of the invention, a thread-free end section is located on the end section of the screw shaft of the head clamp screw that lies opposite the screw head.

When rotating the clamping screw out, the threaded part of the shaft then leaves the thread of the clamping part, the thread-free end section still remains in the threaded aperture of the clamping part and thus prevents the clamping screw from falling out of the clamping part. Owing to the missing thread on the thread-free end section, it is also not possible for a further rotation of the clamping screw to lead to a further displacement of the clamping part. When screwing in the clamping screw again, the thread on the shaft of the clamping screw touches the thread on the clamping part, and the clamp can close.

Further advantages and advantageous embodiments of the invention are disclosed in the dependent claims.

Figure 1:
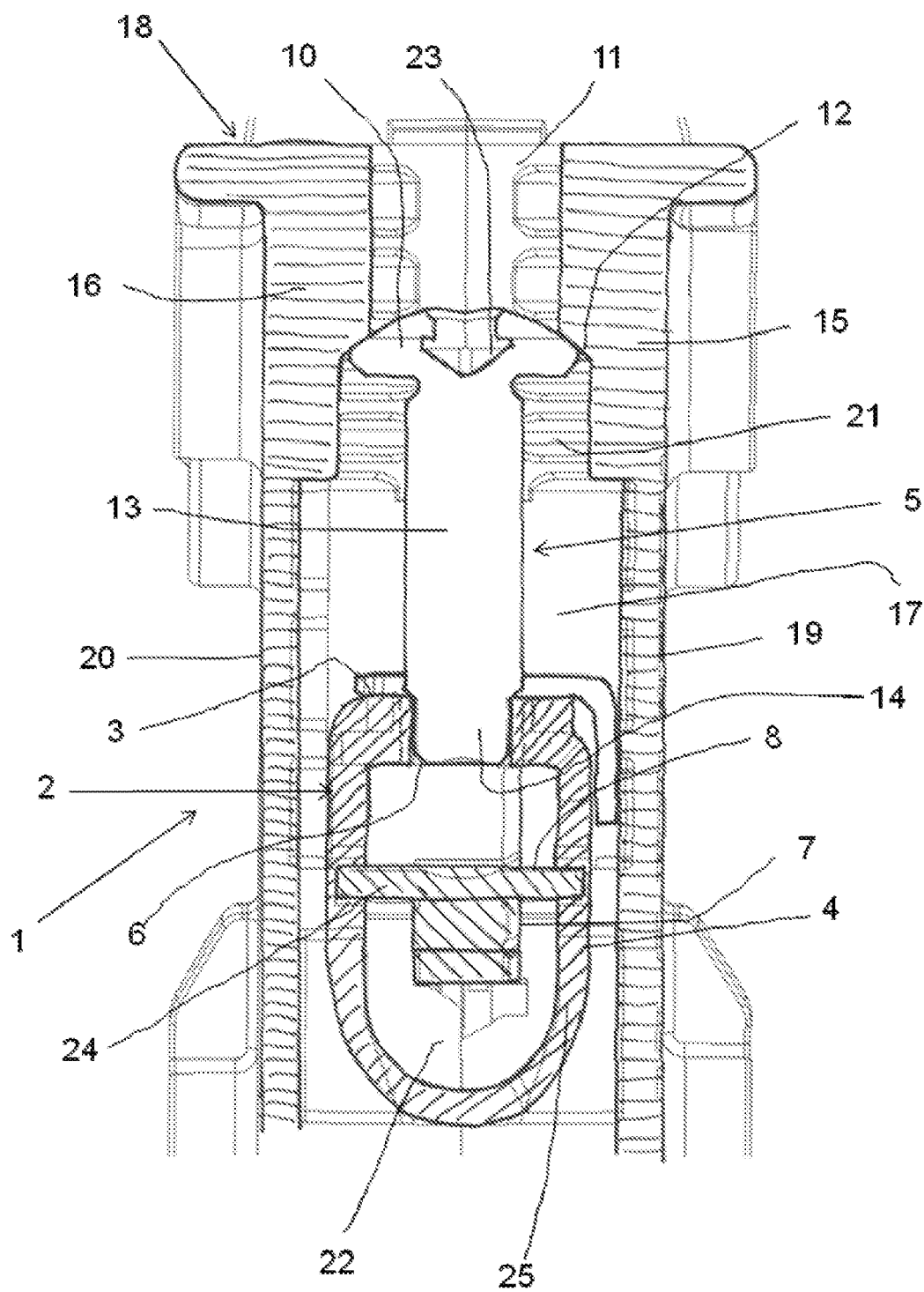
FIG. 1 a view of the clamping receiving region of an installation switching device having a screw connecting clamp in accordance with the invention, the screw connecting clamp is open in this case.
Figure 3:
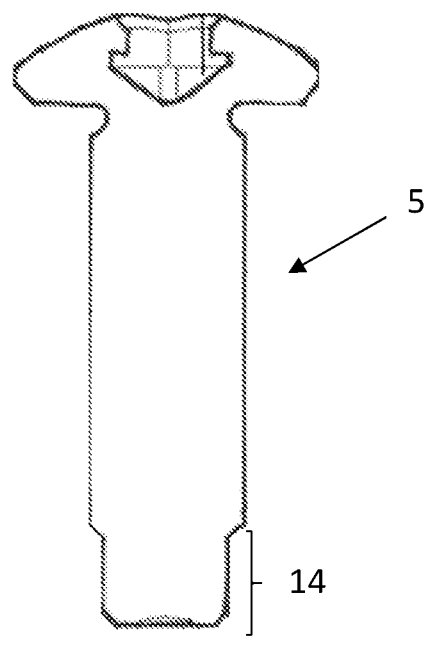
FIG. 3 is a view of a clamping screw in accordance with the invention.

FIG. 1 illustrates a view of the clamping receiving region of an installation switching device having a screw connecting clamp in accordance with the invention. The installation switching device is a circuit breaker. The housing construction of said installation switching device and the arrangement of a screw connecting clamp in a clamp receiving chamber on the narrow face of the housing of the circuit breaker are known in principle. In relation to this, reference is made to DE 10 2007 035 016 A1 and the embodiment of a housing that is illustrated in FIGS. 3 and 4 having screw connecting clamps that are inserted into clamping receiving chambers.

The two housing halves 15, 16 of the housing are evident in the longitudinal view in FIG. 1. FIG. 1 illustrates the view from the housing narrow face, the front face 18 is visible when viewed from above and the two broad faces 19, 20 of the housing are visible when viewed from right and left. The housing halves 15, 16 form a clamping receiving chamber 17 between said housing halves.

The clamp receiving chamber 17 issues upwards in the direction of the front face 18, into a screw receiving region 21 that is dimensioned in such a manner that the screw head 10 of the head clamping screw 5 is guided therein in such a manner that said screw head can be displaced in an axial displacement direction in relation to the longitudinal centre axis of the screw shaft and in particular is prevented from tilting.

The screw receiving region 21 extends upwards in the direction of the front face 18 into a screw access aperture 11 that opens a housing-side access to the screw head 10, in particular for an assembly tool and actuating tool such as a screwdriver. The inner diameter of the screw access aperture 11 is smaller than the outer diameter of the screw head 10. A delimiting means 12 in the form of a shoulder is formed in the housing on the transition between the screw access aperture 11 and the screw receiving region 21. As is evident in FIG. 1, in the case of an entirely opened clamp the screw head 10 pushes on the shoulder that forms the delimiting means 12. The screw head as a consequence cannot fall further upwards through the screw access aperture 11 out of the housing.

The clamping screw 5 is embodied as a head screw. The clamping screw has a bolt-shaped shaft 13 that supports the thread and also a screw head 10 in which a connecting geometry 23 is attached so as to produce a positive-locking contact with an assembly tool. The connecting geometry can be by way of example a cross slot recess, slot recess, hexagonal recess or Torx recess, the assembly tool can then be an accordingly adjusted cross slot screwdriver, hexagonal screwdriver or Torx screwdriver. A thread-free end section 14 is located on the end section of the screw shaft 13 of the head clamping screw 5 that lies opposite the screw head 10.

The clamping part 2 is embodied in an essentially frame-shaped manner. The clamping part can be formed by means of a slotted conductor strip that is bent to an approximately right-angle shaped or box-shaped frame. The two free ends of the slotted conductor strip are then bent towards one another at a right-angle so that they form overlapping frame arms that represent the broad face 3 of the clamping part 2 that is facing the clamping screw 5. A threaded aperture 6 having an inner thread for receiving the clamping screw 5 is located in the broad face 3 of the clamping part 2 that is facing the clamping screw 5.

The broad face 9 of the clamping part 2 that is remote from the clamping screw 5 and lies opposite the broad face 3 of the clamping part 2 that is facing the clamping screw 5 is embodied as rounded. The broad face 9 could however be embodied as planar.

The clamping part 2 comprises an open frame form as a result of which in the view of FIG. 1 in the viewing direction of the drawing an insertion aperture 22 is formed for a connecting conductor that is to be connected.

A current rail 7 is mounted in the housing of the circuit breaker in such a manner as to be fixed to the housing. The current rail 7 comprises essentially the form of a right-angled, planar conductor piece. The current rail is located in the interior of the clamping part 2 between the broad face 3 that is facing the clamping screw 5 and the broad face 9 of the clamping part 2 that is remote from the clamping screw 5. The clamping part 2 is guided in a displaceable manner in its longitudinal extent direction relative to the current rail 7.

On the free end of said clamping part that is remote from the insertion aperture 22, behind the image plane in FIG. 1 and therefore not visible in this figure, the current rail 7 is configured to as to connect a another connecting conductor that leads into the interior of the circuit breaker.

The free end of the current rail 7 that is facing the insertion aperture 22 supports a contact plate 24. The contact plate 24 comprises a rectangular shape and extends with its broad face parallel to the longitudinal face 25 of the clamping part 2, wherein said contact plate extends in the direction of insertion of a connecting conductor, in other words in the direction into the image plane, in front of the longitudinal face 25 of the clamping part 2. The free ends of the contact plate 24 protrude laterally beyond the clamping part 2 so that the free ends form with their ends that protrude beyond the clamping part 2 to some extent retaining tongues with which the contact plate 24 can be retained in the housing of the installation switching device in an accordingly corresponding retainer.

The thread-free end section 14 of the clamping screw is located further within the threaded aperture 6 if the clamping screw 5 is rotated completely out. The thread of the clamping screw is no longer in engagement with the thread of the threaded aperture 6. The clamping screw can be further rotated in this position without the position of the clamping part 2 changing further. Moreover, the clamping screw is prevented from falling out upwards towards the front face 18 by means of the shoulder that forms the delimiting means 12.

Figure 2:
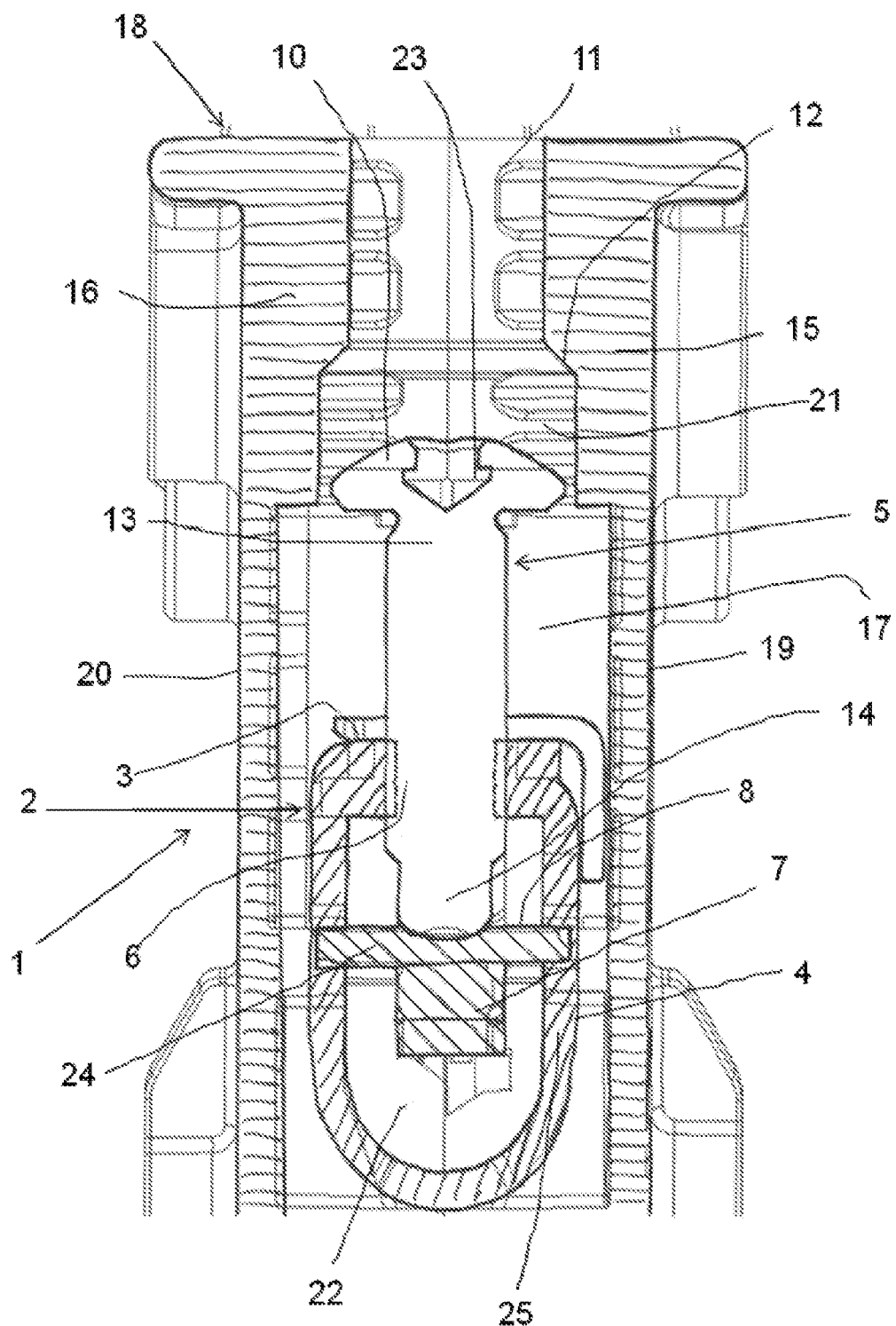
FIG. 2 a view of the clamping receiving region of an installation switching device having a screw connecting clamp in accordance with the invention, in this case the clamping screw is screwed in the closing direction and lies on the current rail.

FIG. 2 illustrates a state after the clamping screw 5 has been rotated back in. The thread of the clamping screw 5 is again in engagement with the inner thread of the threaded aperture 6. The clamping screw 5 has been screwed into the inner-lying region of the clamping part 2. The clamping screw now lies with its thread-free end on the broad face of the current rail 7 that is facing the clamping screw 5. In the case of further rotation inwards, the clamping screw supports itself on said current rail as a result of which the clamping part 2 is then drawn upwards in the direction of the front face 18. FIG. 3 illustrates a clamping screw 5 having a thread-free end section 14 according to an embodiment of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS

1 Screw end clamp
2 Frame-shaped clamping part
3 The broad face of the clamping part that is facing the clamping screw
4 Narrow face of the clamping part
5 Head clamping screw
6 Threaded aperture
7 Current rail
8 Broad face of the current rail
9 The broad face of the clamping part that is remote from the clamping screw
10 Screw head
11 Screw access aperture
12 Delimiting means
13 Screw shaft
14 Thread-free end section
15 Housing half
16 Housing half
17 Clamp receiving chamber
18 Front face
19 Broad face of the housing
20 Broad face of the housing
21 Screw receiving region
22 Insertion aperture
23 Connecting geometry for making contact with an assembly tool
24 Contact plate
25 Longitudinal face of the clamping part

The invention claimed is:

1. An installation switching device, comprising:
a housing;
a screw connecting clamp including an essentially frame-shaped clamping part including longitudinal faces, narrow faces, and broad faces;
a head clamping screw configured to be received in a threaded aperture of the clamping part; and
a current rail arranged in a fixed manner in the installation switching device, the current rail extending through an interior of the frame-shaped clamping part,
wherein a current rail broad face is oriented, as assembled, parallel to a clamping part broad face facing the head clamping screw, and wherein the head clamping screw supports itself, screwed-in, on the current rail and, consequently, the clamping part can be displaced in its longitudinal direction, parallel to one of the narrow faces, relative to the current rail during further screwing in the head clamping screw so that a connecting conductor can be fixedly clamped between a face of the current rail remote from the head clamping screw and the broad face of the clamping part that is remote from the head clamping screw, wherein the housing includes a screw receiving region configured to guide a screw head of the head clamping screw laterally in its axial movement direction, wherein the screw receiving region includes a housing-side screw access aperture that opens an access to the screw head, wherein the screw receiving region includes a delimiter configured to prevent the screw head from penetrating the screw access aperture, wherein a thread-free end section is located on an end section of a screw shaft of the head clamping screw lying opposite the screw head, wherein a threaded section is located on an intermediate section of the screw shaft of the head clamping screw between the screw head and the thread-free end section, wherein, the clamping part and the head clamping screw are operatively configured such that in the case of the head clamping screw being rotated out, the thread-free end section of the head clamping screw is located further within the threaded aperture when the thread of the clamping screw is no longer in engagement with the thread of the threaded aperture so that the head clamping screw can be further rotated in this position without a position of the clamping part changing further, wherein the head clamping screw is dimensioned such that a length from a lower most delimiter contact point of the screw head to an end of the threaded section of the screw shaft is approximately equal to a distance from a top of the clamping part to a lower most portion of the delimiter that is configured to contact the screw head, wherein the screw receiving region is dimensioned such that the screw head of the head clamping screw is guided therein such that the screw head can be displaced in an axial displacement direction in relation to a longitudinal center axis of the screw shaft, wherein the screw receiving region comprises walls bounding at least two sides of the screw head that prevent the screw head from tilting, wherein the screw receiving region comprises a transition in the direction away from the front face into a clamp receiving chamber, the clamp receiving chamber being configured to receive the screw connecting clamp and being wider than the screw receiving region, wherein a length of the screw receiving region in the axial direction from the delimiter to the transition is configured such that at least a portion of the screw head remains within the screw receiving region from an entirely opened screw connecting clamp state to an entire closed screw connecting claim state.

2. The device of claim 1, wherein the housing includes a front face, a fastening face lying opposite the front face, and narrow faces and broad faces that connect the front face and the fastening face,
  wherein the clamp receiving chamber is formed in the housing near to a narrow face of the narrow faces of the housing and between the broad faces of the housing, and
  wherein the clamp receiving chamber is issuing in a front face direction into the screw receiving region.

3. The device of claim 2, wherein the screw receiving region includes a transition in the direction of the front face into the screw access aperture that opens the housing-side access to the screw head, and
  wherein an inner diameter of the screw access aperture is smaller than an outer diameter of the screw head, as a result of which the delimiter, in the form of a shoulder, is formed in the housing on the transition between the screw access aperture and the screw receiving region.

4. The device of claim 1, wherein the clamping screw is configured as a head screw including a bolt-shaped shaft that supports the thread, and the screw head in which a connecting geometry is attached so as to provide a positive-locking contact with an assembly tool.

5. The device of claim 1, wherein the clamping part is formed by a curved conductor strip that is bent to an approximately right-angled or box-shaped frame and the two free ends of the conductor strip are bent towards one another at a right-angle so that the free ends form overlapping frame arms that represent a broad face, of the broad faces, of the clamping part facing the clamping screw and the threaded aperture including an inner thread configured to receive the clamping screw is located in the broad face.

6. The device of claim 5, wherein the current rail is shaped as a rectangular, planar conductor piece and is located in an interior of the clamping part between the broad face facing the clamping screw and a broad face, of the broad faces, of the clamping part remote from the clamping screw, and
  wherein the clamping part is configured to be guided in a displaceable manner in its longitudinal extent direction relative to the current rail.

7. The device of claim 6, wherein a free end of the current rail, facing an insertion aperture, supports a rectangular contact plate extending with its broad face parallel to a longitudinal face, of the longitudinal faces, of the clamping part and in an insertion direction of a connecting conductor in front of the longitudinal face, and
  wherein free ends of the contact plate protrude laterally beyond the clamping part so that the free ends form with their ends that protrude beyond clamping part retaining tongues adapted for the contact plate.

8. The device of claim 1,
  wherein the thread free end section begins at the end of the threaded section, and
  wherein the head clamping screw is dimensioned such that an axial length from the lower most delimiter contact point of the screw head to a terminal end-face of the screw shaft lying opposite the screw head allows for a portion of the thread free end section to be within and surrounded by the threaded aperture in a state where the lower most delimiter contact point of the screw head contacts the delimiter.

* * * * *